US007578405B2

(12) United States Patent
Hagano

(10) Patent No.: US 7,578,405 B2
(45) Date of Patent: Aug. 25, 2009

(54) FUEL CAP HAVING A FUEL TANK PRESSURE REGULATING VALVE

(75) Inventor: Hiroyuki Hagano, Aichi-ken (JP)

(73) Assignee: Toyoda Gosei Co., Ltd., Aichi-pref. (JP)

( * ) Notice: Subject to any disclaimer, the term of this patent is extended or adjusted under 35 U.S.C. 154(b) by 738 days.

(21) Appl. No.: 10/932,302

(22) Filed: Sep. 2, 2004

(65) Prior Publication Data

US 2005/0051550 A1    Mar. 10, 2005

(30) Foreign Application Priority Data

Sep. 4, 2003  (JP)  ............................ 2003-312733
Sep. 26, 2003 (JP)  ............................ 2003-335278

(51) Int. Cl.
*B65D 51/16* (2006.01)
*B65D 53/00* (2006.01)
(52) U.S. Cl. ........................... 220/203.23; 220/203.26; 220/303; 220/304; 220/DIG. 33
(58) Field of Classification Search ............ 220/203.23, 220/203.26, 303, 203.28, 203.24, DIG. 33
See application file for complete search history.

(56) References Cited

U.S. PATENT DOCUMENTS 4,498,493 A    2/1985  Harris
4,785,961 A *  11/1988 Kasugai et al. ......... 220/203.25
5,279,439 A *  1/1994  Kasugai et al. ......... 220/203.23
5,975,328 A *  11/1999 Hagano et al. .............. 220/288
5,996,829 A    12/1999 Hagano et al.

FOREIGN PATENT DOCUMENTS

EP    1 332 979 A1    8/2003
JP    A-10-278958     10/1998
WO    WO 00/69722    11/2000

OTHER PUBLICATIONS

European Search Report dated Aug. 13, 2007 in corresponding European Patent Application No. 04020927.2-1523.

* cited by examiner

*Primary Examiner*—Robin Hylton
(74) *Attorney, Agent, or Firm*—Posz Law Group, PLC

(57) ABSTRACT

A fuel cap of the invention has a pressure regulating valve, which includes a positive pressure valve and a negative pressure valve. The positive pressure valve has a positive pressure valve plug and a first spring. The negative pressure valve has a negative pressure valve plug and a second spring. A ring-shaped projection is protruded outward from the upper circumferential end of the negative pressure valve plug to face a first valve flow path, and functions as a restriction member. The restriction member narrows the passage area of the first valve flow path in a closed position of the negative pressure valve plug, while widening the passage area of the first valve flow path in an open position of the positive pressure valve plug where the negative pressure valve plug moves integrally with the positive pressure valve plug. This arrangement effectively improves the flow characteristics of the pressure regulating valve in the open position of the positive pressure valve.

3 Claims, 9 Drawing Sheets

FUEL CAP HAVING A FUEL TANK PRESSURE REGULATING VALVE

This application claims the benefit of and priority from Japanese Application No. 2003-312733 filed Sep. 4, 2003 and No. 2003-335278 filed Sep. 26, 2003, the contents of which are incorporated herein by reference.

BACKGROUND OF THE INVENTION

1. Field of the Invention

The present invention relates to a fuel cap having a pressure regulating valve that regulates the inner pressure of a fuel tank, and more specifically pertains to a mechanism of improving the flow characteristics of the pressure regulating valve.

2. Description of the Related Art

A known fuel cap includes a cap main body that is screwed to a fuel inlet of a fuel tank, and a pressure regulating valve that is attached to the cap main body to regulate the inner pressure of the fuel tank (see, for example, JP No. 10-278958A). The pressure regulating valve has a positive pressure valve and a negative pressure valve to regulate the inner pressure of the fuel tank within a preset range. The positive valve opens in response to an increase in inner pressure of the fuel tank to be higher than a predetermined level, while the negative valve opens in response to a decrease in inner pressure of the fuel tank to be lower than another predetermined level.

The negative pressure valve has a restriction member on a negative pressure valve plug to increase the differential pressure applied to the valve plug and thereby abruptly heighten the flow rate in the open position of the negative pressure valve. The restriction member, however, undesirably lowers the flow rate in the open position of the positive pressure valve and deteriorates the quick pressure regulation performance of the positive pressure valve.

SUMMARY OF THE INVENTION

An object of the invention is to provide a fuel cap having the improved quick pressure regulation performance of a positive pressure valve.

Another object of the invention is to provide a fuel cap that reduces passage resistance of a pressure regulating valve to enhance response, while decreasing the total number of required parts to attain cost reduction.

In order to attain at least part of the above and the other related objects, the present invention is directed to a fuel cap, which includes a cap main body attached to a tank opening of a fuel tank and a pressure regulating valve that is received in the cap main body and opens and closes an intra-cap flow path formed in the cap main body to regulate an inner pressure of the fuel tank. The pressure regulating valve has a positive pressure valve that opens in response to an increase in inner pressure of the fuel tank to be higher than a first pressure level, and a negative pressure valve that opens in response to a decrease in inner pressure of the fuel tank to be lower than a second pressure level.

The positive pressure valve has a positive pressure valve plug that opens and closes a first valve flow path, which forms part of the intra-cap flow path, and a first spring that has one end fixed to the cap main body and applies a pressing force in a closing direction to the positive pressure valve plug. The positive pressure valve plug includes: a positive pressure valve main body; a seat element that is formed on the positive pressure valve main body to face the first valve flow path and is seated on a first seating element provided on the cap main body to close the first valve flow path; a second valve flow path that is formed to pass through the positive pressure valve main body and forms part of the intra-cap flow path; and a second seating element that is formed on the positive pressure valve main body in a neighborhood of the second valve flow path.

The negative pressure valve has a negative pressure valve plug that opens and closes the second valve flow path, and a second spring that has one end fixed to the cap main body and applies a pressing force in a closing direction to the negative pressure valve plug. The negative pressure valve plug includes: a cup-shaped negative pressure valve main body that has an upper wall and a cylindrical side wall that is protruded from outer circumference of the upper wall; a seat element that is formed on the upper wall and is seated on the second seating element to close the second valve flow path; and a restriction member that is located to face the first valve flow path and narrows an passage area of the first valve flow path in a closed position of the negative pressure valve plug, while widening the passage area of the first valve flow path in an open position of the positive pressure valve plug where the negative pressure valve plug moves integrally with the positive pressure valve plug.

In the fuel cap of the invention, the pressure regulating valve opens and closes the intra-cap flow path to regulate the inner pressure of the fuel tank within a preset range. In the positive pressure valve, the positive pressure valve plug opens against the pressing force of the first spring in response to an increase in inner pressure of the fuel tank to be higher than the first pressure level. In the negative pressure valve, the negative pressure valve plug opens in response to a decrease in inner pressure of the fuel tank to be lower than the second pressure level. This arrangement effectively keeps the inner pressure of the fuel tank within the preset range.

The restriction member provided on the negative pressure valve plug increases the differential pressure applied to the negative pressure valve plug in the negative pressure condition to improve the valve-opening characteristics. The restriction member widens the passage area of the first valve flow path in the positive pressure condition to abruptly increases the flow rate. This arrangement ensures the good flow characteristics of the positive pressure valve.

The preferable present embodiment of the present invention is directed to a fuel cap that opens and closes a tank opening. The fuel cap includes: a closer that opens and closes the tank opening in a sealed state; a valve chest forming-member that is set on the closer to form a valve chest, which connects a tank with atmosphere; and a pressure regulating valve that is received in the valve chest and opens and closes a valve flow path formed in the valve chest, so as to regulate inner pressure of the tank. The pressure regulating valve has a valve plug that opens and closes the valve flow path and a spring that presses the valve plug in a closing direction. The spring has one end held to press the valve plug and the other end held by spring lock ends, which are formed by thermally caulking upper opening ends of the valve chest formingmember.

The fuel cap of the invention has the pressure regulating valve placed in the valve chest formed in the shut-of member. The pressure regulating valve has the valve chest, which is pressed by the spring. When the differential pressure applied to the valve plug exceeds the setting load of the spring, the pressure regulating valve opens to regulate the inner pressure of the tank. The spring has one end held by the valve plug to press the valve plug and the other end held by the spring lock ends of the valve chest-forming member. The spring lock ends are formed by thermally caulking the opening ends of the valve chest-forming member. The opening of the valve chest is thus not closed over a wide area. This arrangement thus desirably reduces the passage resistance of the fluid flowing through the valve chest.

The spring lock ends are formed by thermally caulking the opening ends of the valve chest-forming member. This arrangement does not require the inner cover, which is essentially included in the prior art structure, thus decreasing the total number of required parts and attaining cost reduction.

Another embodiment of the invention is also directed to a manufacturing method of a fuel cap. The manufacturing method includes the steps of placing a valve plug in a valve chest and setting a spring to have one end press the valve plug; temporarily holding the other end of the spring with a temporary joint jig to compress the spring; thermally caulking opening ends of a valve chest-forming member to form spring lock ends; and detaching the temporary joint jig from the other end of the spring and making the other end of the spring held by the spring lock ends.

The pressure regulating valve is set in the fuel cap according to this manufacturing method of the invention. The other end of the spring is temporarily held by the temporary joint jig, before being held by the spring lock ends. In the temporary holding state, the opening ends of the valve chest-forming member are thermally caulked to form the spring lock ends. No pressing force of the spring is applied to the opening ends of the valve chest-forming member, while the opening ends of the valve chest-forming member are thermally caulked to form the spring lock ends. This arrangement ensures easy formation of the spring lock ends.

DESCRIPTION OF THE PREFERRED EMBODIMENTS

A. The First Embodiment (1) General Structure of Fuel Cap 10

Figure 1:
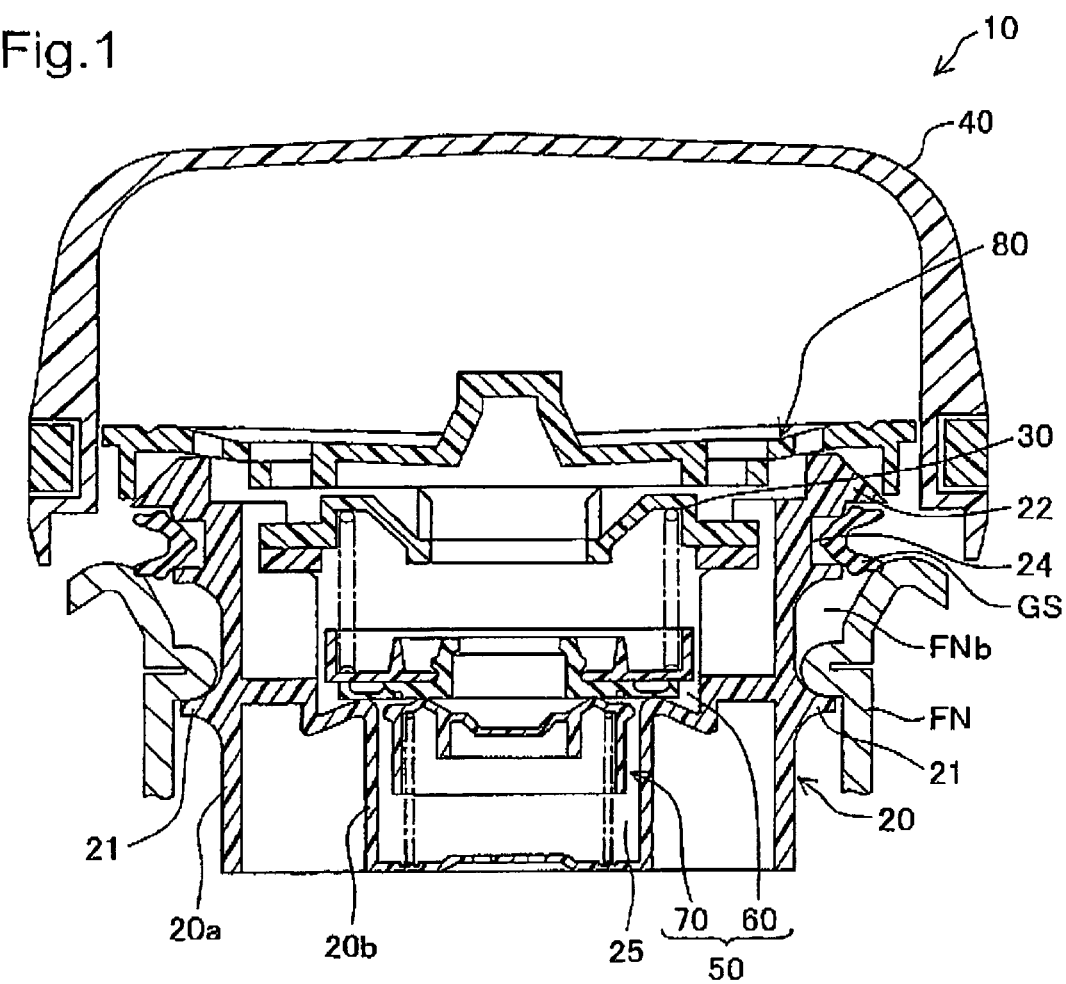
FIG. 1 is a sectional view illustrating the structure of a fuel cap in a first embodiment of the invention.

FIG. 1 is a sectional view illustrating the structure of a fuel cap 10 in a first embodiment of the invention. As shown in FIG. 1, the fuel cap 10 is attached to a filler neck FN having a fuel inlet FNb (tank opening) to feed a supply of fuel to a fuel tank (not shown). The fuel cap 10 has a cap main body 20 that is made of a synthetic resin material like polyacetal, a cover 40 that has a handle and is made of a synthetic resin material like nylon and is mounted on the cap main body 20, an inner cover 30 that closes an upper opening of the cap main body 20 and forms a valve chest 25, a pressure regulating valve 50 that is received in the valve chest 25, a torque mechanism 80, and a gasket GS that is attached to the upper outer circumference of the cap main body 20 to seal the cap main body 20 from the filler neck FN.

The cap main body 20 has a substantially cylindrical outer tubular member 20a with a cap engagement element 21, which engages with a mating element formed on the inner wall of the filler neck FN, and a valve chest-forming member 20b that is located in the lower portion of the inside of the outer tubular member 20a to form the valve chest 25. The valve chest-forming member 20b, the upper portion of the outer tubular member 20a, and the inner cover 30 set on the cap main body 20 define the valve chest 25. The pressure regulating valve 50 located in the valve chest 25 includes a positive pressure valve 60 and a negative pressure valve 70 to regulate the pressure in the fuel tank within a preset range.

The gasket GS is set on a lower face of an upper flange 22 of the cap main body 20. The gasket GS is located between a seal support element 24 of the flange 22 and the fuel inlet FNb of the filler neck FN. When the fuel cap 10 is inserted into the fuel inlet FNb, the gasket GS is pressed against the seal support element 24 to exert the sealing effects. The torque mechanism 80 gives a click when the rotational torque exceeds a specified level in the operator's closing action of the fuel cap 10. The operator thus confirms that the fuel cap 10 is tightly fastened with the rotational torque of not less than the specified level.

(2) Structure of Pressure Regulating Valve 50

Figure 2:
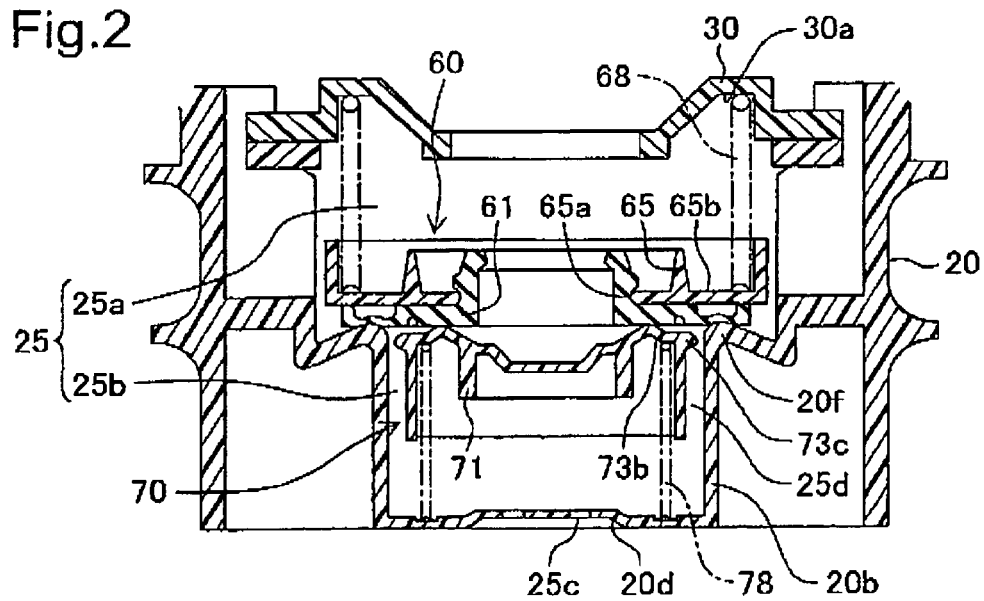
FIG. 2 is an enlarged sectional view showing the structure of a pressure regulating valve included in the fuel cap of FIG. 1.

FIG. 2 is an enlarged sectional view showing the structure of the pressure regulating valve 50. As mentioned above, the pressure regulating valve 50 includes the positive pressure valve 60 and the negative pressure valve 70. The positive pressure valve 60 is located in an upper chamber 25a of the valve chest 25, while the negative pressure valve 70 is located in a lower chamber 25b of the valve chest 25. A first seating element 20f is formed on an outward inclined upper portion of the valve chest-forming member 20b between the upper chamber 25a and the lower chamber 25b. A first valve flow path 25d inside the first seating element 20f communicates with a connection hole 25c formed in a bottom 20d. The connection hole 25c is linked to the fuel tank via a non-illustrated filler pipe.

(2)-1 Structure of Positive Pressure Valve 60

The positive pressure valve 60 has a positive pressure valve plug 61 to open and close the first valve flow path 25d, a valve support member 65, and a first spring 68 that has one end fixed to the inner cover 30 and applies a pressing force in a closing direction to the positive pressure valve plug 61 via the valve support member 65.

Figure 3:
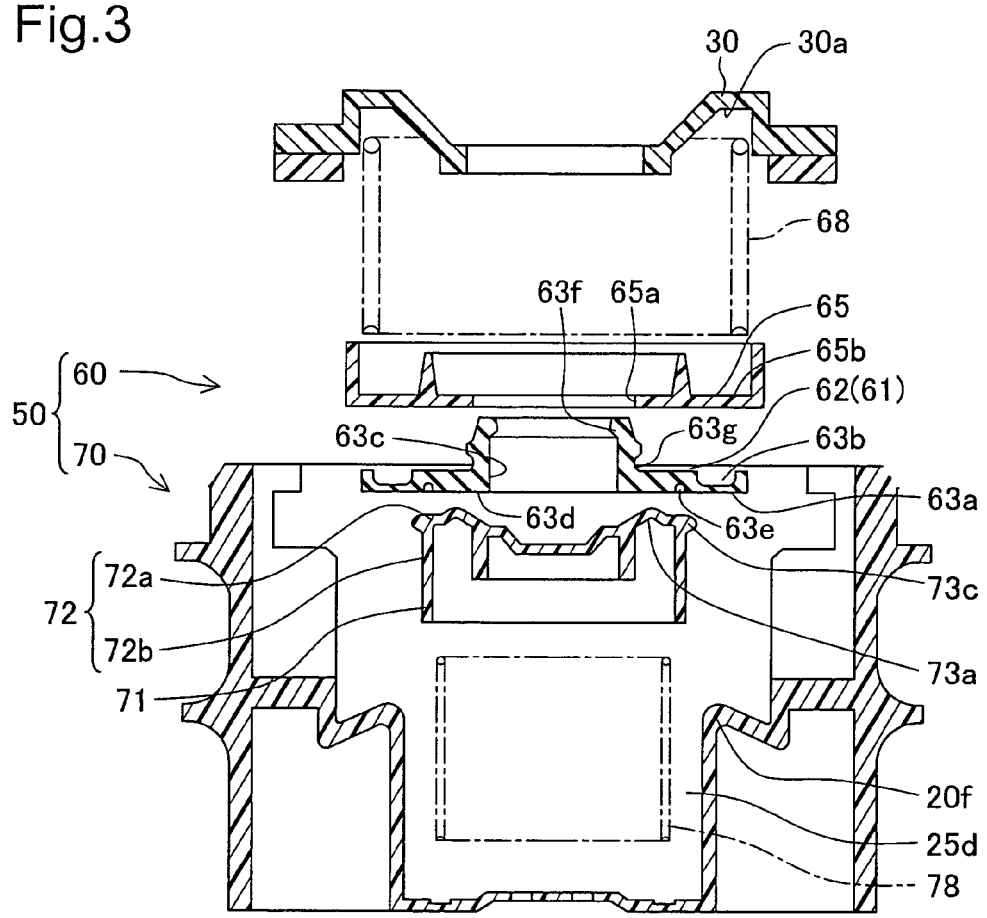
FIG. 3 is a decomposed sectional view of the pressure regulating valve.

FIG. 3 is a decomposed sectional view of the pressure regulating valve 50. The positive pressure valve plug 61 has a disc-shaped positive pressure valve main body 62, which is made of, for example, fluororubber and has a through-hole and projections to exert the valve functions. The positive pressure valve main body 62 has a seat element 63a, which is seated on the first seating element 20f to close the first valve flow path 25d. The presence of a ring-shaped recess 63b formed on the upper outer circumference of the positive pressure valve main body 62 makes the thin-wall seat element 63a. The thin-wall seat element 63a is seated on the first seating element 20f and is elastically bent to enhance the sealing properties. A second valve flow path 63c is formed to pass through the center of the positive pressure valve main body 62 to connect with the first valve flow path 25d. A lower face of the positive pressure valve main body 62 forms a second seating element 63d in the vicinity of the second valve flow path 63c. The second seating element 63d works as a seating plane of the negative pressure valve 70 as discussed later. A ring-shaped groove 63e is formed on the lower face of the positive pressure valve main body 62 to be located inside the ring-shaped recess 63b. The ring-shaped groove 63e facilitates the elastic bending in the closed position of the positive pressure valve plug 61.

A tubular fitting element 63f is formed upright on the center of the positive pressure valve plug 61 to encircle the second valve flow path 63c. A side support recess 63g is formed on the side of the tubular fitting element 63f. The tubular fitting element 63f is fit in a fitting hole 65a of the valve support member 65, so that the positive pressure valve plug 61 is set in the valve support member 65. An upper face of the valve support member 65 forms a spring support element 65b to support one end of the first spring 68. The other end of the first spring 68 is held by a support element 30a of the inner cover 30. The first spring 68 is accordingly spanned between the spring support element 65b and the inner cover 30.

(2)-2 Structure of Negative Pressure Valve 70

As shown in FIG. 2, the negative pressure valve 70 includes a resin negative pressure valve plug 71 and a second spring 78 that is spanned between the negative pressure valve plug 71 and the bottom 20d to press the negative pressure valve plug 71.

As shown in FIG. 3, the negative pressure valve plug 71 has a cup-shaped negative pressure valve main body 72, which includes an upper wall 72a and a cylindrical side wall 72b protruded from the outer circumference of the upper wall 72a. The negative pressure valve main body 72 has projections to exert the valve functions. A circular ridge-like seat element 73a is formed on the upper wall 72a of the negative pressure valve main body 72 to be seated on the second seating element 63d of the positive pressure valve plug 61 and close the second valve flow path 63c. A ring-shaped projection 73c is protruded outward from the upper circumferential end of the side wall 72b to face the first valve flow path 25d. The ring-shaped projection 73c functions as a restriction member, which narrows the passage area of the first valve flow path 25d in the closed position of the negative pressure valve plug 71, while widening the passage area of the first valve flow path 24d in the open position of the positive pressure valve plug 61, where the negative pressure valve plug 71 moves integrally with the positive pressure valve plug 61.

(3) Operations of Pressure Regulating Valve 50

Figure 4:
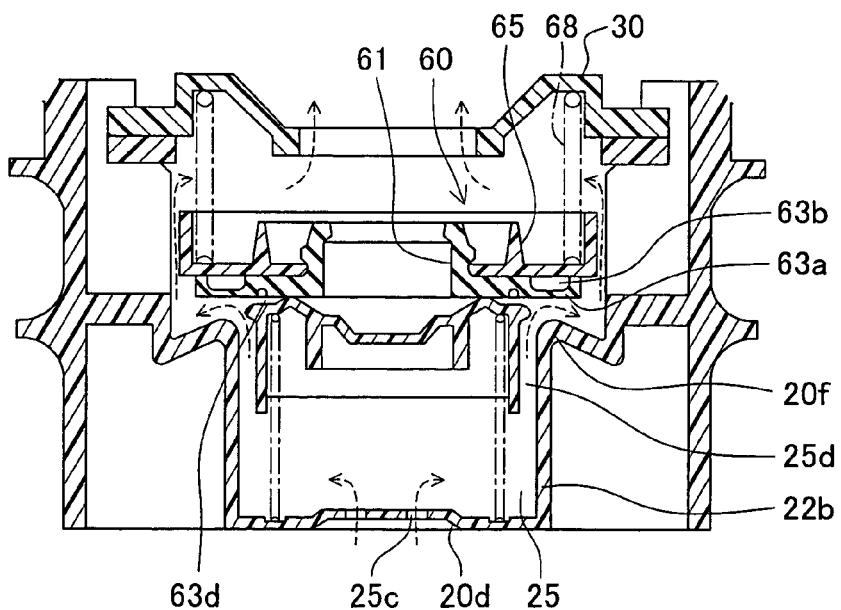
FIG. 4 shows a valve-opening action in a positive pressure condition of the pressure regulating valve.

The positive pressure valve 60 having the above structure regulates the pressure in the fuel tank in the following manner. The fuel cap 10 is set in the filler neck FN as shown in FIGS. 1 and 2. In response to an increase in inner pressure of the fuel tank to be higher than a first pressure level, the pressure regulating valve 50 shifts to the state of FIG. 4. The positive pressure valve plug 61 and the valve support member 65 go up against the pressing force of the first spring 68. The fuel tank then communications with the atmosphere via the intra-cap passage, that is, the filler pipe, the connection hole 25c formed in the bottom 20d, the first valve flow path 25d, the gap on the outer circumference of the positive pressure valve plug 61, and an aperture of the inner cover 30. This functions to reduce the positive pressure in the fuel tank. When the communication with the atmosphere lowers the differential pressure applied to the positive pressure valve plug 61 to be lower than the pressing force of the first spring 68, the positive pressure valve plug 61 is pressed down to be closed by the pressing force of the first spring 68 as shown in FIG. 2. The positive pressure valve plug 61 opens and closes to restrict the inner pressure of the fuel tank to or below the first pressure level. The seat element 63a at the position corresponding to the ring-shaped recess 63b of the positive pressure valve plug 61 comes into contact with the first seating element 20f. The thin-wall seat element 63a formed by the ring-shaped recess 63b is bent elastically to ensures the high sealing properties.

Figure 5:
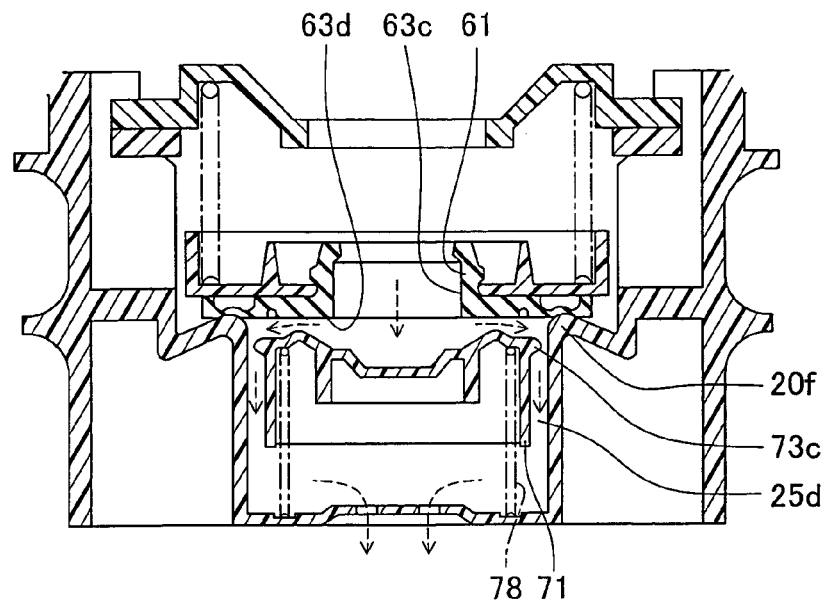
FIG. 5 shows a valve-opening action in a negative pressure condition of the pressure regulating valve.

In response to a decrease in inner pressure of the fuel tank to be lower than a second pressure level, on the other hand, the negative pressure valve plug 71 moves downward against the pressing force of the second spring 78 as shown in FIG. 5. The negative pressure valve plug 71 then separates from the second seating element 63d of the positive pressure valve plug 61, while the positive pressure valve plug 61 is seated on the first seating element 20f. A passage is formed between the negative pressure valve plug 71 and the positive pressure valve plug 61 to maintain this seating position. The fuel tank accordingly communicates with the atmosphere via the second valve flow path 63c, the first valve flow path 25d, and the connection hole 25c formed in the bottom 20d. This functions to reduce the negative pressure in the fuel tank. The negative pressure valve plug 71 closes when the differential pressure applied to the negative pressure valve plug 71 exceeds the pressing force of the second spring 78.

(4) Functions and Effects of Pressure Regulating Valve 50

The structure of the embodiment has functions and effects discussed below, in addition to those discussed above.

Figure 6:
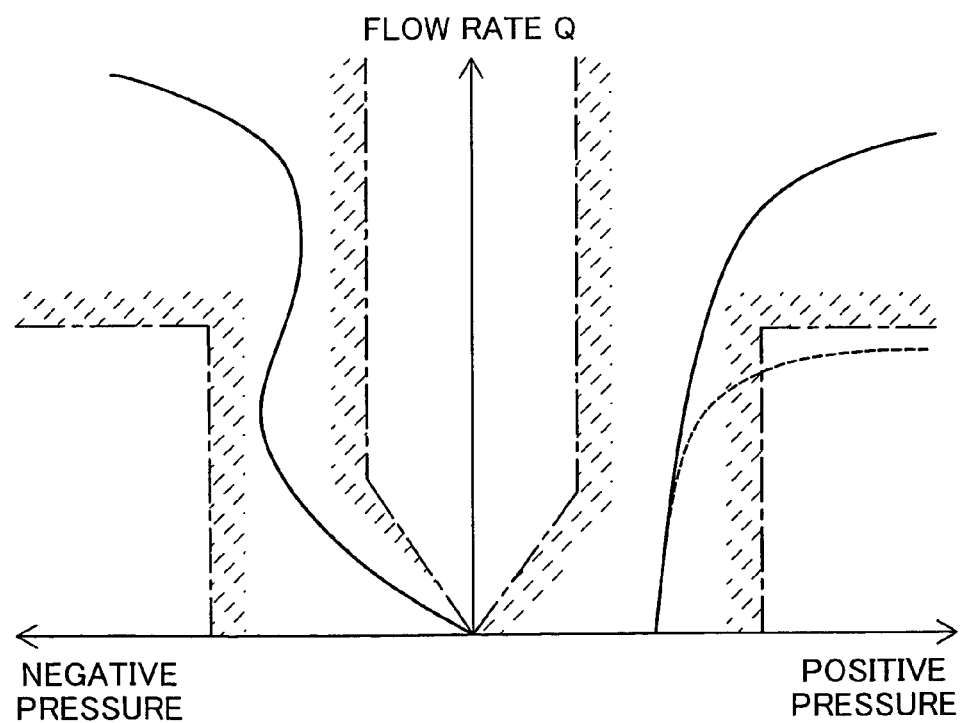
FIG. 6 is a graph showing flow characteristics of the pressure regulating valve.

The simple structure of the restriction member formed by the ring-shaped projection 73c on the negative pressure valve 70 significantly improves the flow characteristics of the pressure regulating valve 50. FIG. 6 is a graph showing the flow characteristics of the pressure regulating valve 50. In the graph of FIG. 6, ranges surrounded by the one-dot chain line represent the flow characteristics of the positive pressure valve 60 and the negative pressure valve 70. The solid line curve and the broken line curve respectively show the flow characteristics of this embodiment and a comparative example.

The negative pressure valve 70 preferably has the flow characteristics within the range of the one-dot chain line where a flow rate Q abruptly increases to quickly restrain a variation in inner pressure of the fuel tank. In the open position of the negative pressure valve 70 (see FIG. 5), the restriction member formed by the ring-shaped projection 73c raises the differential pressure applied to the negative pressure valve plug 71 and abruptly increases the valve-opening force of the negative pressure valve 70. In negative pressures of not less than a preset level, the flow rate Q abruptly increases in the range of the one-dot chain line.

In the open position of the positive pressure valve 60 (see FIG. 4), the negative pressure valve plug 71 pressed by the second spring 78 moves up integrally with the positive pressure valve plug 61. The ring-shaped projection 73c moves above the first seating element 20f to widen the passage area of the first valve flow path 25d. In the open position of the positive pressure valve 60, the flow rate abruptly increases in the range of the one-dot chain line. The structure of the embodiment thus ensures the excellent valve-opening characteristics, compared with the comparative example shown by the broken line.

B. The Second Embodiment

Figure 7:
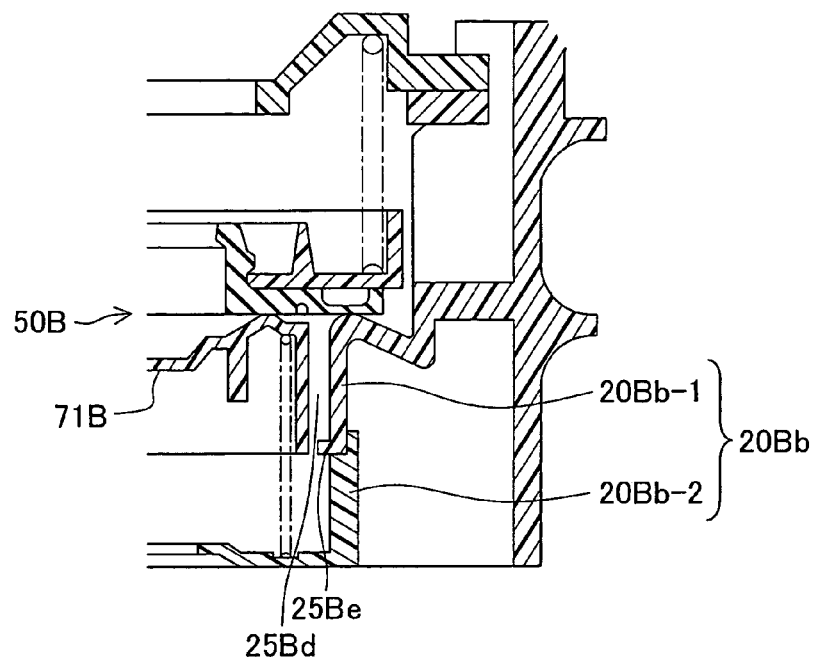
FIG. 7 is a sectional view illustrating the structure of a pressure regulating valve in a second embodiment of the invention.

FIG. 7 is a sectional view illustrating the structure of another pressure regulating valve 50B in a second embodiment. The second embodiment is characterized by the structure of the restriction member, which is a ring-shaped projection 25Be protruded inward from the lower circumferential end of a valve chest-forming member 20Bb. The valve chest-forming member 20Bb includes an upper valve chest-forming member 20Bb-1 and a lower valve chest-forming member 20Bb-2, which are integrated by ultrasonic welding or heat welding. The ring-shaped projection 25Be is protruded inward from the bottom end of the upper valve chest-forming member 20Bb-1. The ring-shaped projection 25Be widens the passage area of a first valve flow path 25Bd with a rise of a negative pressure valve plug 71B. The structure of the second embodiment thus exerts the similar functions and effects to those of the first embodiment.

C. The Third Embodiment

Figure 8:
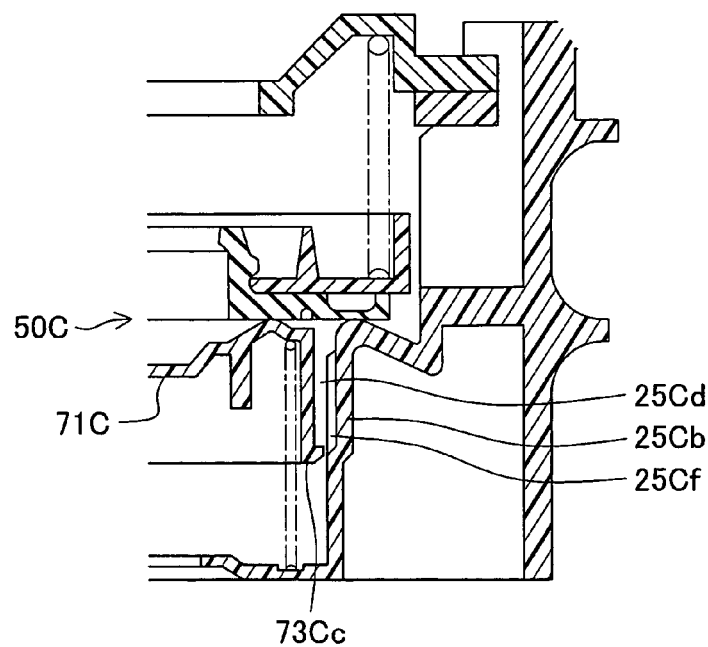
FIG. 8 is a sectional view illustrating the structure of a pressure regulating valve in a third embodiment of the invention.

FIG. 8 is a sectional view illustrating the structure of still another pressure regulating valve 50C in a third embodiment. In this modified example, a ring-shaped projection 73Cc working as the restriction member is protruded outward from the lower circumferential end of a negative pressure valve plug 71C, and six guide ribs 25Cf are formed on the inner wall of a valve chest-forming member 20Cb to be arranged along the circumference and extended in the axial direction. The guide ribs 25Cf work to guide vertical motions of the negative pressure valve plug 71C and thereby prevent a potential center deviation. The ring-shaped projection 73Cc widens the passage area of a first valve flow path 25Cd with a rise of the negative pressure valve plug 71C. The structure of this modified example thus exerts the similar functions and effects to those of the above embodiment.

D. The Fourth Embodiment

(1) General Structure of Fuel Cap 110

Figure 9:
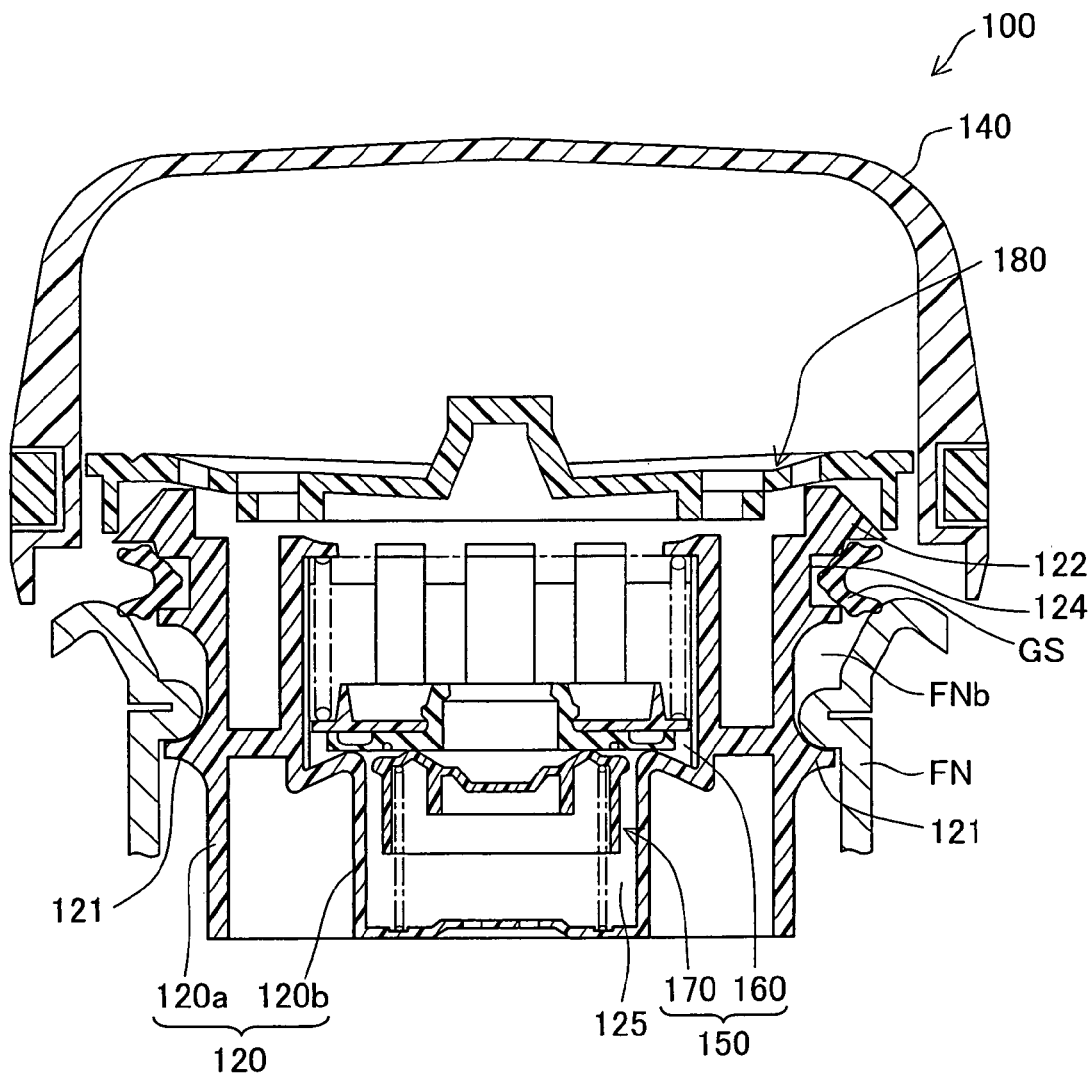
FIG. 9 is a sectional view illustrating the structure of a fuel cap in a fourth embodiment of the invention.

FIG. 9 is a sectional view illustrating the structure of a fuel cap 110 in a fourth embodiment of the invention. As shown in FIG. 9, the fuel cap 110 is attached to a filler neck FN having a fuel inlet FNb (tank opening) to feed a supply of fuel to a fuel tank (not shown). The fuel cap 110 has a cap main body 120 (closer) that is made of a synthetic resin material like polyacetal, a cover 140 that has a grip member and is made of a synthetic resin material like nylon and is mounted on the cap main body 120, a pressure regulating valve 150 that is received in a valve chest 125, a torque mechanism 180, and a gasket GS that is attached to the upper outer circumference of the cap main body 120 to seal the cap main body 120 from the filler neck FN.

The cap main body 120 has a substantially cylindrical outer tubular member 120a with a cap engagement element 121, which engages with a mating element formed on the inner wall of the filler neck FN, and a valve chest-forming member 120b that is located inside of the outer tubular member 120a to form the valve chest 125. The pressure regulating valve 150 located in the valve chest 125 includes a positive pressure valve 160 and a negative pressure valve 170 to regulate the pressure in the fuel tank within a preset range.

The gasket GS is set on a lower face of an upper flange 122 of the cap main body 120. The gasket GS is located between a seal support element 124 of the flange 122 and the fuel inlet FNb of the filler neck FN. When the fuel cap 110 is inserted into the fuel inlet FNb, the gasket GS is pressed against the seal support element 124 to exert the sealing effects. The torque mechanism 180 gives a click when the rotational torque exceeds a specified level in the operator's closing action of the fuel cap 110. The operator thus confirms that the fuel cap 110 is tightly fastened with the rotational torque of not less than the specified level.

(2) Structure of Pressure Regulating Valve 150

Figure 10:
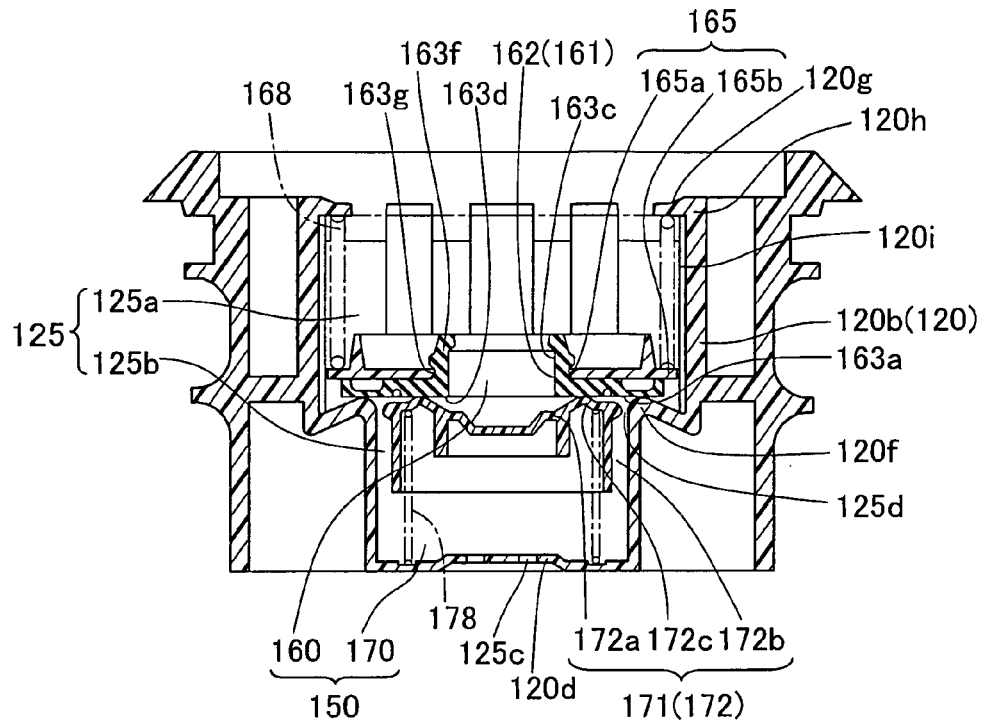
FIG. 10 is a sectional view showing the structure of a pressure regulating valve included in the fuel cap of FIG. 9.

FIG. 10 is a sectional view showing the structure of the pressure regulating valve 150. As mentioned above, the pressure regulating valve 150 includes the positive pressure valve 160 and the negative pressure valve 170. The positive pressure valve 160 is located in an upper chamber 125a of the valve chest 125, while the negative pressure valve 170 is located in a lower chamber 125b of the valve chest 125. A first seating element 120f is formed on an outward inclined upper portion of the valve chest-forming member 120b between the upper chamber 125a and the lower chamber 125b. A first valve flow path 125d inside the first seating element 120f communicates with a connection hole 125c formed in a bottom 120d. The connection hole 125c is linked to the fuel tank via a non-illustrated filler pipe.

(2)-1 Structure of Positive Pressure Valve 160

The positive pressure valve 160 has a positive pressure valve plug 161 to open and close the first valve flow path 125d, a valve support member 165, and a first spring 168. The positive pressure valve plug 161 has a disc-shaped positive pressure valve main body 162, which is made of, for example, fluororubber and has a through-hole and projections to exert the valve functions. The positive pressure valve main body 162 has a seat element 163a, which is seated on the first seating element 120f to close the first valve flow path 125d. A second valve flow path 163c is formed to pass through the center of the positive pressure valve main body 162 to connect with the first valve flow path 125d. A lower face of the positive pressure valve main body 162 forms a second seating element 163d in the vicinity of the second valve flow path 163c. The second seating element 163d works as a seating plane of the negative pressure valve 170 as discussed later.

A tubular fitting element 163f is formed upright on the center of the positive pressure valve plug 161 to encircle the second valve flow path 163c. A side support recess 163g is formed on the side of the tubular fitting element 163f. The tubular fitting element 163f is fit in a fitting hole 165a of the valve support member 165, so that the positive pressure valve plug 161 is set in the valve support member 165. An upper face of the valve support member 165 forms a spring support element 165b to support one end of the first spring 168. The other end of the first spring 168 is supported by spring lock ends 120g formed on the top of the valve chest-forming member 120b. Namely the first spring 168 is spanned between the spring support element 165b and the spring lock ends 120g. Each of the spring lock end 120g is formed by bending an opening end 120h of the valve chest-forming member 120b by ultrasonic machining as discussed below. Guide projections 120i are arranged at equal intervals on the inner wall of the valve chest-forming member 120b to face the upper chamber 125a of the valve chest 125. The guide projections 120i guide the periphery of the valve support member 165 to keep the horizontal attitude of the positive pressure valve plug 161.

(2)-2 Structure of Negative Pressure Valve 170

The negative pressure valve 170 includes a resin negative pressure valve plug 171 and a second spring 178 that is spanned between the negative pressure valve plug 171 and the bottom 120d to press the negative pressure valve plug 171. The negative pressure valve plug 171 has a cup-shaped negative pressure valve main body 172, which includes an upper wall 172a and a cylindrical side wall 172b protruded from the outer circumference of the upper wall 172a. A circular ridge-like seat element 173a is formed on the upper wall 172a of the negative pressure valve main body 172 to be seated on the second seating element 163d of the positive pressure valve plug 161 and close the second valve flow path 163c.

(3) Assembly of Pressure Regulating Valve 150

Figure 11:
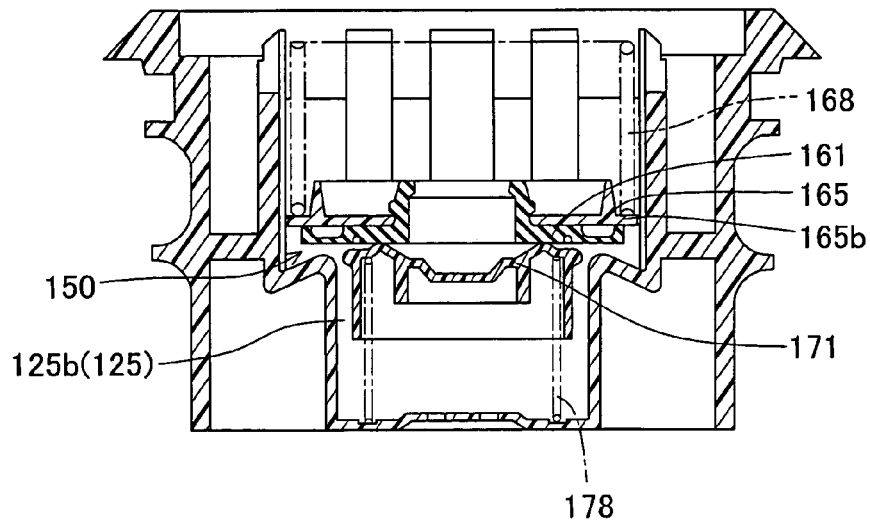
FIG. 11 shows one step in an assembly process of the pressure regulating valve.
Figure 12:
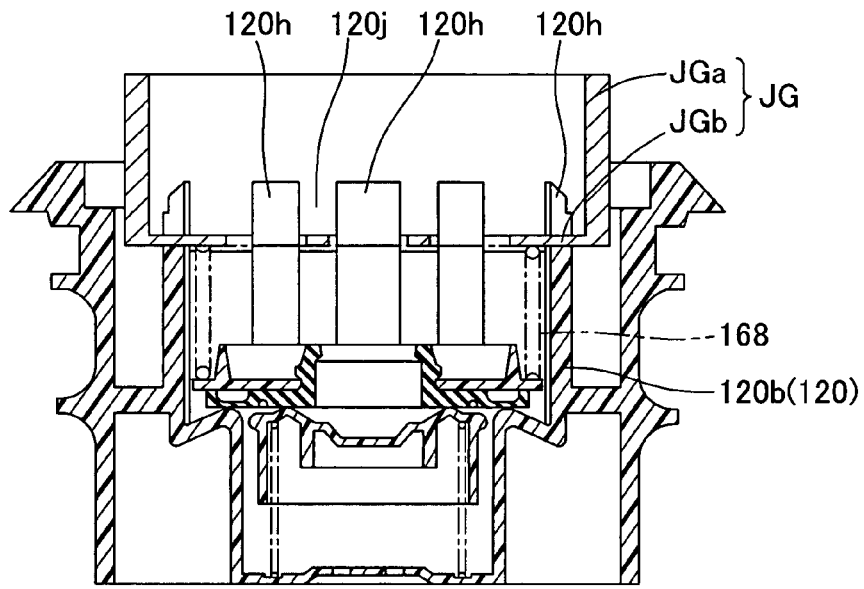
FIG. 12 shows a step subsequent to FIG. 11 in the assembly process of the pressure regulating valve.
Figure 13:
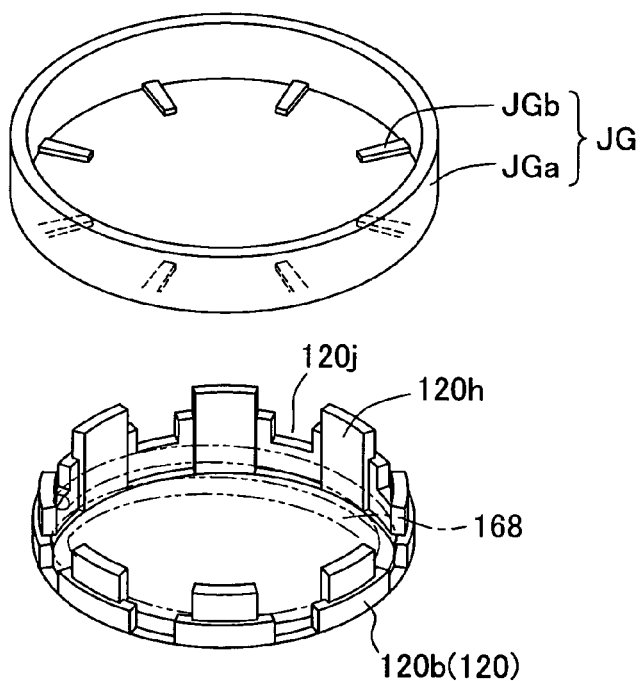
FIG. 13 is a perspective view showing the upper portion of a valve chest-forming member and a temporary joint jig.
Figure 14:
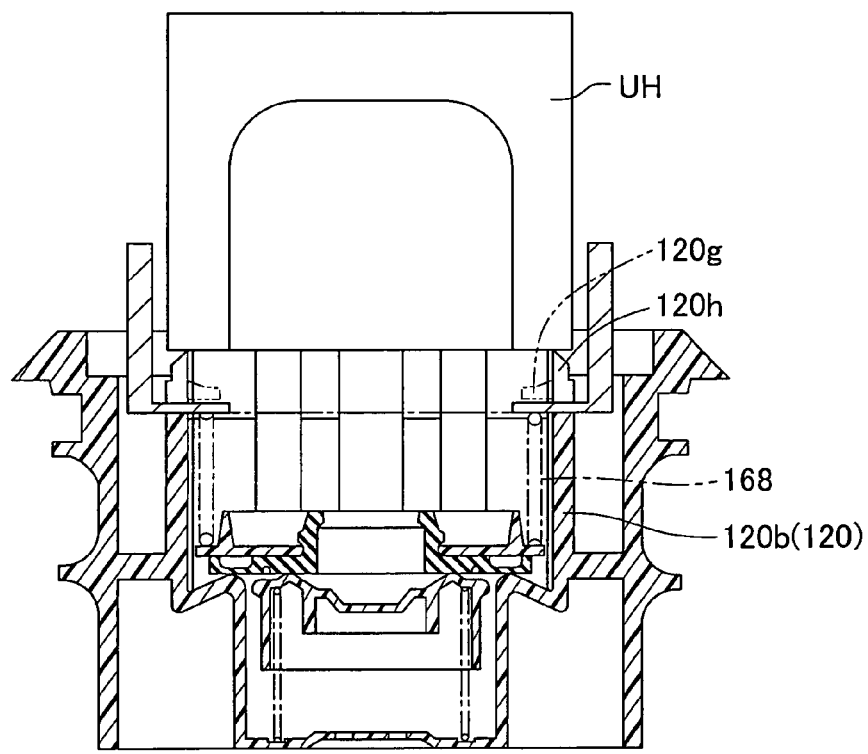
FIG. 14 shows a step subsequent to FIG. 12 in the assembly process of the pressure regulating valve.

FIG. 11 shows an assembly process of the pressure regulating valve 150. The assembly process of the pressure regulating valve 150 in the valve chest 125 first sets the second spring 178 and the negative pressure valve plug 171 in the lower chamber 125b of the valve chest 125. The process then locates the positive pressure valve plug 161 combined with the valve support member 165 above the negative pressure valve plug 171 and sets the lower end of the first spring 168 on the spring support element 165b. As shown in FIG. 12, the first spring 168 is compressed by a temporary joint jig JG. FIG. 13 is a perspective view showing the upper portion of the valve chest-forming member 120b and the temporary joint jig JG. Eight opening ends 120h are arranged at equal intervals and are projected upward from the top of the valve chest-forming member 120b. A gap 120j is formed between each pair of adjacent opening ends 120h. The temporary joint jig JG includes a ring member JGa and holding claws JGb protruded inward from the ring member JGa. The holding claws JGb have a narrower width than that of the gaps 120j to be receivable in the gaps 120j. As shown in FIG. 12, the holding claws JGb of the temporary joint jig JG are inserted into the gaps 120j to hold the first spring 168. As shown in FIG. 14, an ultrasonic horn UH is then pressed against the opening ends 120h to execute ultrasonic machining. The ultrasonic machining softens the radical opening ends 120h and bends the softened opening ends 120h inward to form the spring lock ends 120g as shown in FIG. 9. Removal of the temporary joint jig JG causes the first spring 168 to stretch and have its upper end come into contact with the spring lock ends 120g. The first spring 168 is thus spanned between the spring lock ends 120g and the valve support member 165 to press the positive pressure valve plug 161.

(3) Operations of Pressure Regulating Valve 150

Figure 15:
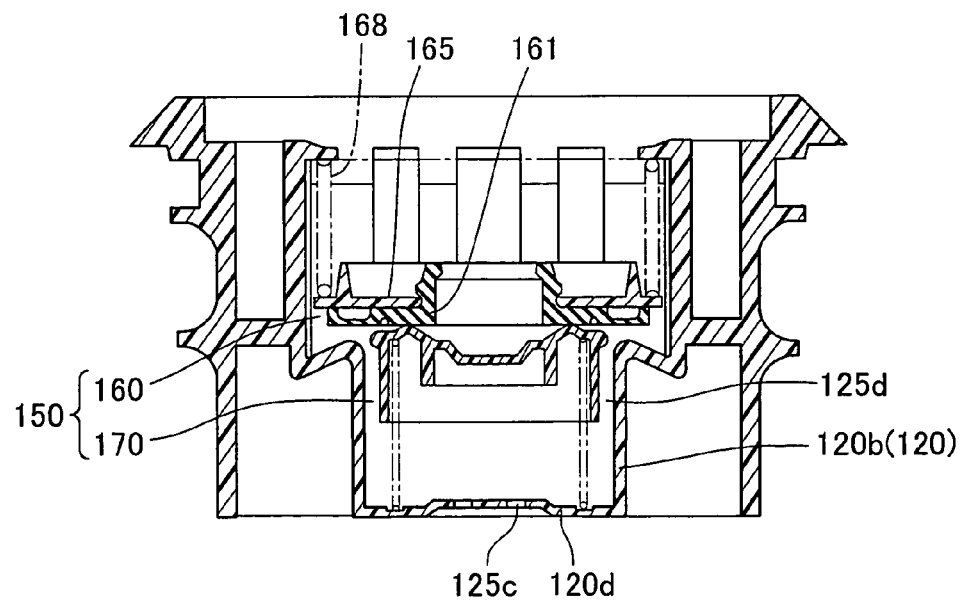
FIG. 15 shows a valve-opening action of a positive pressure valve in the pressure regulating valve.

The positive pressure valve 160 having the above structure regulates the pressure in the fuel tank in the following manner. The fuel cap 110 is set in the filler neck FN as shown in FIGS. 9 and 10. In response to an increase in inner pressure of the fuel tank to be higher than a first pressure level, the pressure regulating valve 150 shifts to the state of FIG. 15. The positive pressure valve plug 161 and the valve support member 165 go up against the pressing force of the first spring 168. The fuel tank then communications with the atmosphere via the flow path including the valve chest 125, that is, the filler pipe, the connection hole 125c formed in the bottom 120d, the first valve flow path 125d, the gap on the outer circumference of the positive pressure valve plug 161, and the upper opening of the valve chest-forming member 120b. This functions to reduce the positive pressure in the fuel tank. When the communication with the atmosphere lowers the differential pressure applied to the positive pressure valve plug 161 to be lower than the pressing force of the first spring 168, the positive pressure valve plug 161 is pressed down to be closed by the pressing force of the first spring 168 as shown in FIG. 10. The positive pressure valve plug 161 opens and closes to restrict the inner pressure of the fuel tank to or below the first pressure level.

Figure 16:
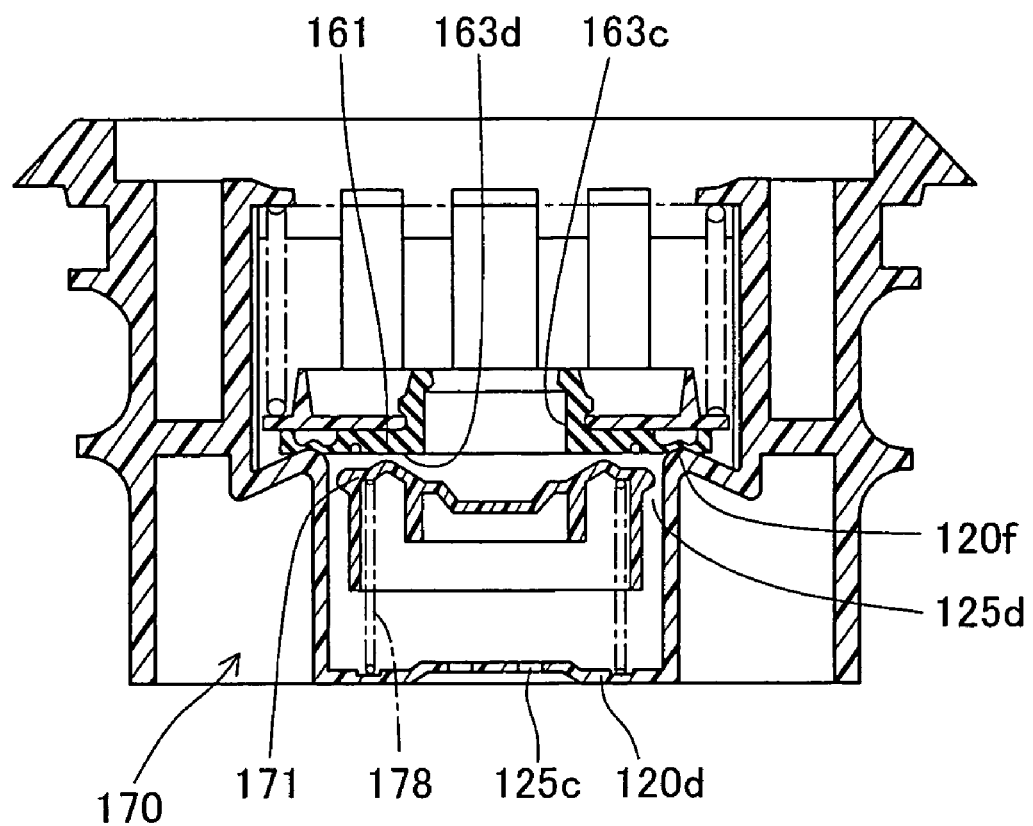
FIG. 16 shows a valve-opening action of a negative pressure valve in the pressure regulating valve.

In response to a decrease in inner pressure of the fuel tank to be lower than a second pressure level, on the other hand, the negative pressure valve plug 171 moves downward against the pressing force of the second spring 178 as shown in FIG. 16. The negative pressure valve plug 171 then separates from the second seating element 163d of the positive pressure valve plug 161, while the positive pressure valve plug 161 is seated on the first seating element 120f. A passage is formed between the negative pressure valve plug 171 and the positive pressure valve plug 161 to maintain this seating position. The fuel tank accordingly communicates with the atmosphere via the second valve flow path 163c, the first valve flow path 125d, and the connection hole 125c formed in the bottom 120d. This functions to reduce the negative pressure in the fuel tank. The negative pressure valve plug 171 closes when the differential pressure applied to the negative pressure valve plug 171 exceeds the pressing force of the second spring 178.

(3) Functions and Effects of Embodiment

The structure of the embodiment has functions and effects discussed below, in addition to those discussed above.

The upper end of the first spring 168 is held by the spring lock ends 120g, which are formed by thermally caulking the opening ends 120h of the valve chest-forming member 120b. The upper opening of the valve chest 125 is accordingly not closed over the wide area. This structure effectively reduces the passage resistance of the fluid flowing through the valve chest 125.

The spring lock ends 120g are formed by thermally caulking the opening ends 120h of the valve chest-forming member 120b. This structure does not require the inner cover, which is essentially included in the prior art structure, thus decreasing the total number of required parts and thereby attaining desirable cost reduction.

E. Another Embodiment

The embodiment discussed above is to be considered in all aspects as illustrative and not restrictive. There may be many modifications, changes, and alterations without departing from the scope or spirit of the main characteristics of the present invention. Some examples of possible modification are given below.

(1) In the above embodiment and the first and the second modified examples, the projection working as the restriction member is integrally formed with the negative pressure valve plug or with the valve chest-forming member. The restriction member may be a separate element fixed to the negative pressure valve plug or the inner wall of the valve chest-forming member of the cap main body.

(2) The fuel cap of the above embodiment has both the positive pressure valve and the negative pressure valve. This structure is, however, not essential and the fuel cap may have only a positive pressure valve or a negative pressure valve.

(3) The above embodiment regards application of the invention to the fuel cap. The technique of the invention is, however, not restricted to the fuel cap but may be applied to any cap with a pressure regulating valve that regulates the inner pressure of a tank.

(4) The ultrasonic machining discussed above is only the example of forming the spring lock ends 120g by thermal caulking. Any of other diverse methods, for example, heating with a hot plate or thermal plastic resin deformation, may be adopted for the same purpose.

The foregoing detailed description of the invention has been provided for the purpose of explaining the principles of the invention and its practical application, thereby enabling others skilled in the art to understand the invention for various embodiments and with various modifications as are suited to the particular use contemplated. The foregoing detailed description is not intended to be exhaustive or to limit the invention to the precise embodiments disclosed. Modifications and equivalents will be apparent to practitioners skilled in this art and are encompassed within the spirit and scope of the appended claims.

What is claimed is:

1. A fuel cap comprising a cap main body attached to a tank opening of a fuel tank and a pressure regulating valve that is received in the cap main body and opens and closes an intra-cap flow path formed in the cap main body to regulate an inner pressure of the fuel tank, the pressure regulating valve having a positive pressure valve that opens in response to an increase in inner pressure of the fuel tank to a level higher than a first pressure level, and a negative pressure valve that opens in response to a decrease in inner pressure of the fuel tank to a level lower than a second pressure level, the second pressure level being lower than the first pressure level, the positive pressure valve includes a positive pressure valve plug that opens and closes a first valve flow path, the first valve flow path forming part of the intra-cap flow path, and a spring that has an end supported by the cap main body and applies a pressing force in a closing direction to the positive pressure valve plug, the positive pressure valve plug including:

a positive pressure valve main body;

a seat element that is formed on the positive pressure valve main body to face the first valve flow path and is seated on a first seating element provided on the cap main body to close the first valve flow path;

a second valve flow path that is formed to pass through the positive pressure valve main body and forms part of the intra-cap flow path; and a second seating element that is formed on the positive pressure valve main body in a neighborhood of the second valve flow path, the negative pressure valve including a negative pressure valve plug that opens and closes the second valve flow path, and a second spring that has an end supported to the cap main body and applies a pressing force in a closing direction to the negative pressure valve plug, the negative pressure valve plug including:

a cup-shaped resin negative pressure valve main body having an upper wall and a cylindrical side wall that is protruded from outer circumference of the upper wall;

a seat element that is formed on the upper wall and is seated on the second seating element to close the second valve flow path; and a restriction member that includes a ring-shaped projection that protrudes from an outer circumference of the side wall of the negative pressure valve main body, wherein the restriction member is located to face the first valve flow path, which narrows a passage area of the first valve flow path in a closed position of the negative pressure valve plug, while widening the passage area of the first valve flow path in an open position of the positive pressure valve plug where the negative pressure valve plug moves integrally with the positive pressure valve plug, the restriction member keeps the passage area of the first valve flow path in an open position of the negative pressure valve plug when the positive pressure valve is in the closed position, and the first valve flow path is joined with the second flow path and is formed between the cylindrical side wall and the cap main body.

2. The fuel cap in accordance with claim 1, wherein the ring-shaped projection is integrally formed with the negative pressure valve plug.

3. The fuel cap in accordance with claim 1, wherein the ring-shaped projection is a separate element fixed to an upper portion of the negative pressure valve plug.

* * * * *